United States Patent
Surti et al.

(10) Patent No.: US 7,586,495 B2
(45) Date of Patent: Sep. 8, 2009

(54) RENDERING MULTIPLE CLEAR RECTANGLES USING A PRE-RENDERED DEPTH BUFFER

(75) Inventors: Prasoonkumar Surti, Folsom, CA (US); Hong Jiang, El Dorado Hills, CA (US); Steven J. Spangler, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 402 days.

(21) Appl. No.: 11/647,720

(22) Filed: Dec. 29, 2006

(65) Prior Publication Data

US 2008/0158250 A1    Jul. 3, 2008

(51) Int. Cl.
  *G06T 15/00*    (2006.01)
  *G06T 15/40*    (2006.01)
  *G09G 5/36*    (2006.01)
  *G09G 5/00*    (2006.01)
  *G09G 5/02*    (2006.01)
  *G06K 9/40*    (2006.01)
  *G06K 9/36*    (2006.01)

(52) U.S. Cl. ............... 345/581; 345/422; 345/589; 345/547; 345/549; 382/254; 382/276

(58) Field of Classification Search .......... 345/418, 345/422, 428, 581–582, 587, 629–630, 589, 345/635, 547–549; 382/162–167, 254, 276, 382/284–285, 305
See application file for complete search history.

(56) References Cited

U.S. PATENT DOCUMENTS

| | | | |
|---|---|---|---|
| 7,199,793 B2 * | 4/2007 | Oh et al. | 345/419 |
| 2003/0193527 A1 * | 10/2003 | Pharr | 345/853 |
| 2004/0095357 A1 * | 5/2004 | Oh et al. | 345/589 |

* cited by examiner

*Primary Examiner*—Wesner Sajous
(74) *Attorney, Agent, or Firm*—Buckley, Maschoff & Talwalkar LLC

(57) ABSTRACT

According to some embodiments, systems, methods, apparatus, computer program code and means are provided to set a first depth value associated with a plurality of pixels of a video image comprising a plurality of planes, create a first clear rectangle with respect to the first depth value, color render the pixels that are not associated with the first clear rectangle, and render the plurality of planes.

20 Claims, 7 Drawing Sheets

Associate a first clear rectangle depth value of a video image comprising a plurality of planes, wherein each plane comprises a plurality of pixels
201

Define a first clear rectangle with respect to the first depth value on one or more of the plurality of planes, where the first clear rectangle is defined by inactivating pixels
202

Color render the pixels that are not associated with the first clear rectangle
203

Render the plurality of planes
204

RENDERING MULTIPLE CLEAR RECTANGLES USING A PRE-RENDERED DEPTH BUFFER

BACKGROUND

A digital video disk ("DVD") may store data such as movies containing both video and sound. A high density DVD ("HD-DVD") may have the capacity to store substantially more data than a standard DVD which may allow more information to be stored digitally in a same amount of physical space.

Information stored on a HD-DVD may comprise one or more planes that when composited create a HD-DVD image. Each individual plane may comprise one or more pixels. As HD-DVD images become more complex, more pixels may be needed to comprise the image and by increasing the number of pixels, more processing may be required. Accordingly, an increased amount of processing may also increase power consumption and bandwidth usage.

BRIEF DESCRIPTION OF THE DRAWINGS

FIG. 2 is a block diagram of a process according to some embodiments.

DETAILED DESCRIPTION

The several embodiments described herein are provided solely for the purpose of illustration. Embodiments may include any currently or hereafter-known versions of the elements described herein. Therefore, persons in the art will recognize from this description that other embodiments may be practiced with various modifications and alterations.

Figure 1:
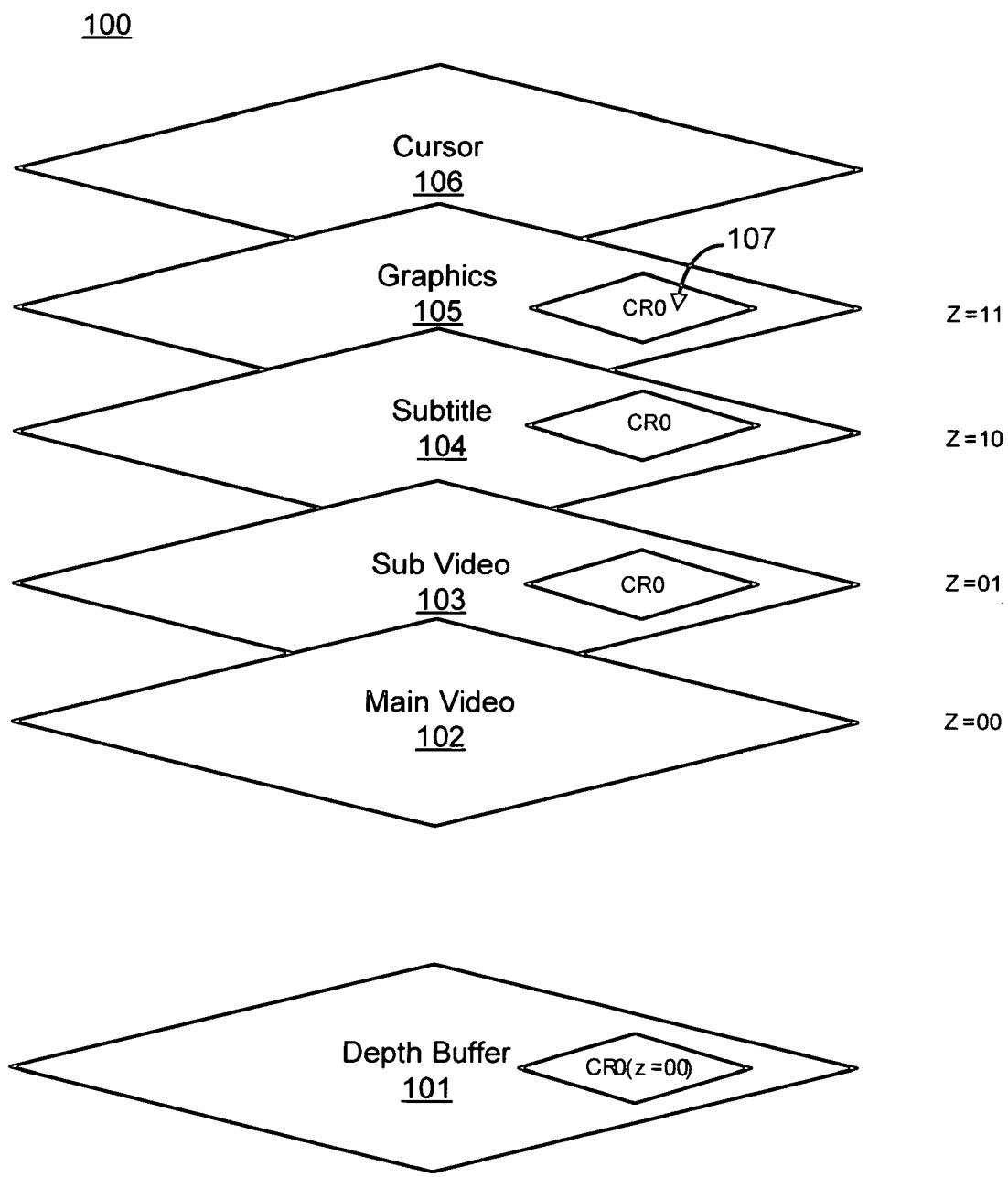
FIG. 1 illustrates a plurality of planes according to some embodiments.

Referring now to FIG. 1, an embodiment of a video image 100 is shown. The video image 100 may comprise a plurality of planes including, but not limited to, a main video plane 102, a sub-video plane 103, a subtitle plane 104, a graphics plane 105, and a cursor plane 106. In some embodiments, one or more planes may comprise a clear rectangle 107.

In conventional methods, when compositing the video image 100 (e.g. when each plane may be combined into a composite image), each plane may be rendered (e.g. created from a plurality of pixels) and each pixel may be associated with a specific color. During the rendering process, individual clear rectangles may be defined by locations associated with a plane and thus pixels associated with a color may be inactivated during the rendering process. Rendering each pixel of each plane, prior to implementing clear rectangles may require more processor resources and power than necessary.

In some embodiments, each plane of an image may be assigned a depth value, indicated as Z in FIG. 1, to define an order of the planes. As shown in FIG. 1, depth values may be represented in binary format, however any numerical or alphabetical format may be used. For example, and as shown in FIG. 1, the main video plane 102 may have a depth of 00, the sub video plane 103 may have a depth value of 01, the subtitle plane 104 may have a depth value of 10, and the graphics plane may have a depth value of 11. In some embodiments, the cursor plane 106 may be a top-most plane and thus may not have a depth value. In some embodiments, the video image may be an HD-DVD image.

Each clear rectangle 107 may be an area of a plane that includes inactivated pixels. When viewed from a top down perspective, the effect of having inactivated pixels allows a plane at a lower depth to be viewed at a plane located at a higher depth. For example, and as shown in FIG. 1, a clear rectangle 107, indicated as CR0, may be in a position on the graphics plane 105, subtitle plane 104, and sub-video plane 103 such that a portion of the main video plane 102 may be displayed in the clear rectangle 107 located on the graphics plane 105. In some embodiments, clear rectangle may be a programming command that creates a clear rectangle. In some embodiments a clear rectangle may be created in the same area of consecutive planes.

The depth of the CR0 107 may be determined by a value stored in a depth buffer 101. For example, the depth buffer 101 may contain a depth value of 00 for CR0 107. A depth value of 00 may define a maximum depth of CR0 107 or may expose a plane with a depth value of 00. By using a depth buffer 101, pixels associated with a clear rectangle may not be color rendered during the composition process and thus, by using a depth buffer 101, power consumption may be reduced in the compositing process. In some embodiments, the depth buffer may be stored in a cache memory or a dirty cache line.

Now referring to FIG. 2, an embodiment of a process 200 is shown. Process 200 may be executed by any combination of hardware, software, and firmware, including but not limited to, the apparatus 500 of FIG. 5 or system 700 of FIG. 7. Some embodiments of process 200 may reduce video composition memory usage and power consumption.

At 201, a first clear rectangle depth value is associated with a video image comprising a plurality of planes, wherein each plane comprises a plurality of pixels. In some embodiments, the first clear rectangle depth value may be stored in a depth buffer. The first clear rectangle depth buffer, may comprise, but is not limited to, an identifier of one or more clear rectangles. In some embodiments the depth buffer may store a second depth value of a second clear rectangle for the video image may be set. In some embodiments, the video image may be a HD-DVD image.

Next at 202, a first clear rectangle is defined with respect to the first depth value on one or more of the plurality of planes, where the first clear rectangle is defined by inactivating pixels. Pixels that are inactivated may not comprise a color (e.g. may be clear, opaque, or see through). In some embodiments the first clear rectangle may be rendered using one or more rules. For example, when a clear rectangle is rendered, a destination depth value, the depth value stored in the depth buffer, may be read and compared to a source depth value, the depth assigned to each pixel in a plane of the plurality of planes.

In some embodiments, a clear rectangle may be rendered using a depth test enable that reads from a depth buffer stored in cache. However, the use of a depth test enable may increase latency in reading from the depth buffer. In some embodiments, a graphics driver may define a depth buffer to enable the rendering process. For example, the graphics driver may group all clear rectangles such that they can be rendered using a depth buffer where the depth buffer is stored in hardware. Storing the depth buffer in hardware may eliminate the need of reading from a depth buffer stored in cache and may reduce the latency of reading from a depth buffer stored in cache memory.

In some embodiments, entering a value of a top-most numbered plane in the depth buffer may indicate that no pixels are to be inactivated. For example, and as shown in FIG. 1, the top-most numbered plane is plane 105 that is associated with a depth value of 11. Thus, entering a depth value of 11 in the depth buffer may require a clear rectangle to expose plane 11. However, since plane 11 is the top-most numbered plane it may already be exposed from a top-down perspective. In some embodiments, each clear rectangle of the video image may be rendered but without colors assigned to each pixel.

At 203, the pixels that are not associated with the first clear rectangle are color rendered and at 204, the plurality of planes are rendered. In some embodiments, an execution unit may perform the color rendering. The execution unit may be a programmable core or processor that renders all layers of a video image.

Figure 3:
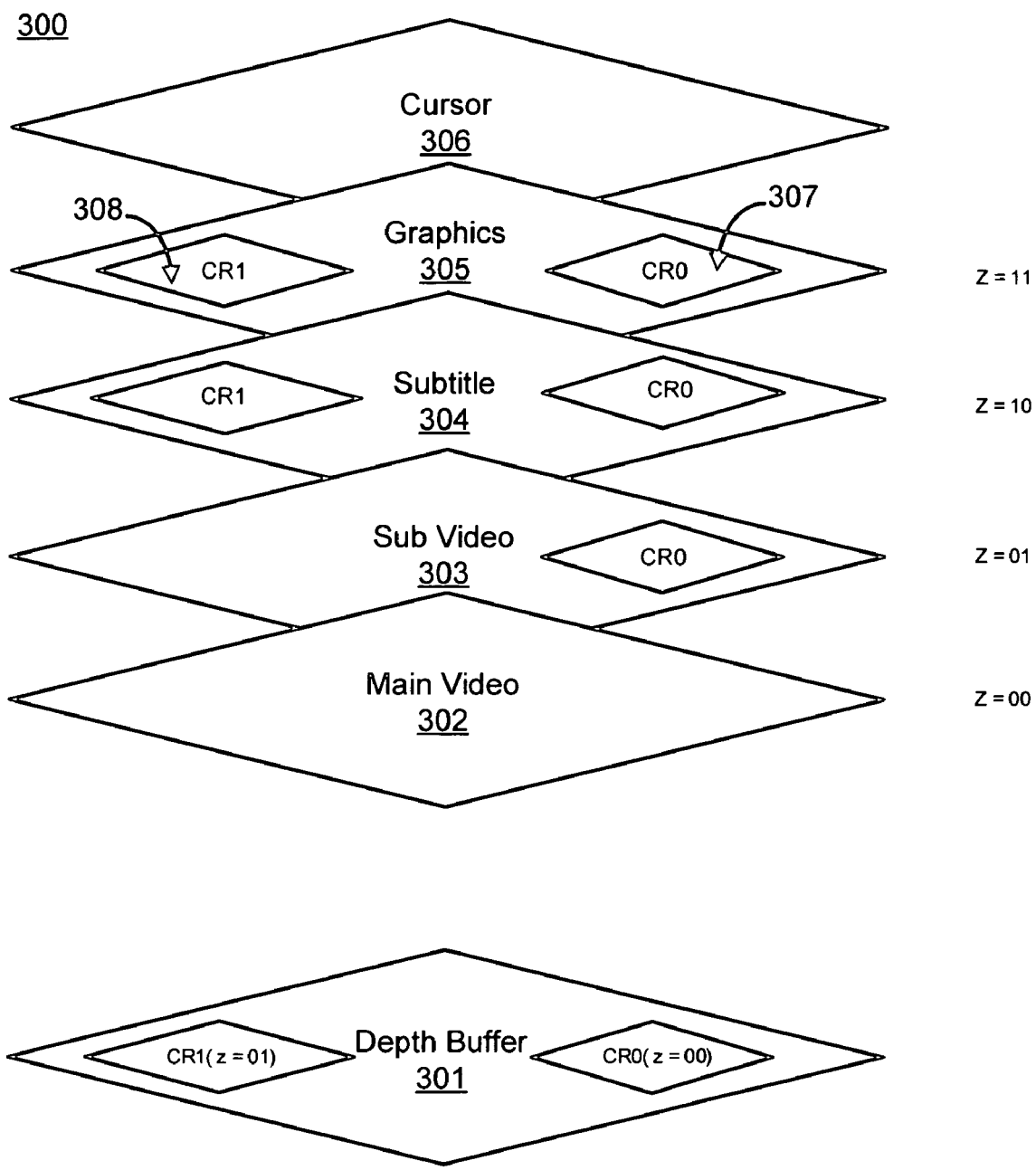
FIG. 3 illustrates a plurality of planes according to some embodiments

FIG. 3 illustrates an embodiment of a video image 300. The video image may comprise a plurality of planes as described with respect to similarly named planes of FIG. 1. As illustrated in FIG. 3, the video image 300 may comprise a first clear rectangle 307 indicated as CR0 and a second clear rectangle 308 indicated as CR1.

A depth buffer 301 may indicate that CR1 308 has a depth value of 01 and that CR0 307 may have a depth value of 00. As illustrated in FIG. 3, when viewing from a top-down perspective, CR1 308 may expose the sub-video plane 303 through the graphics plane 305 and the subtitle plane 304 while CR0 307 may expose the main video plane 302 through the graphics plane 305, the subtitle plane 304, and the sub-video plane 303.

Figure 4:
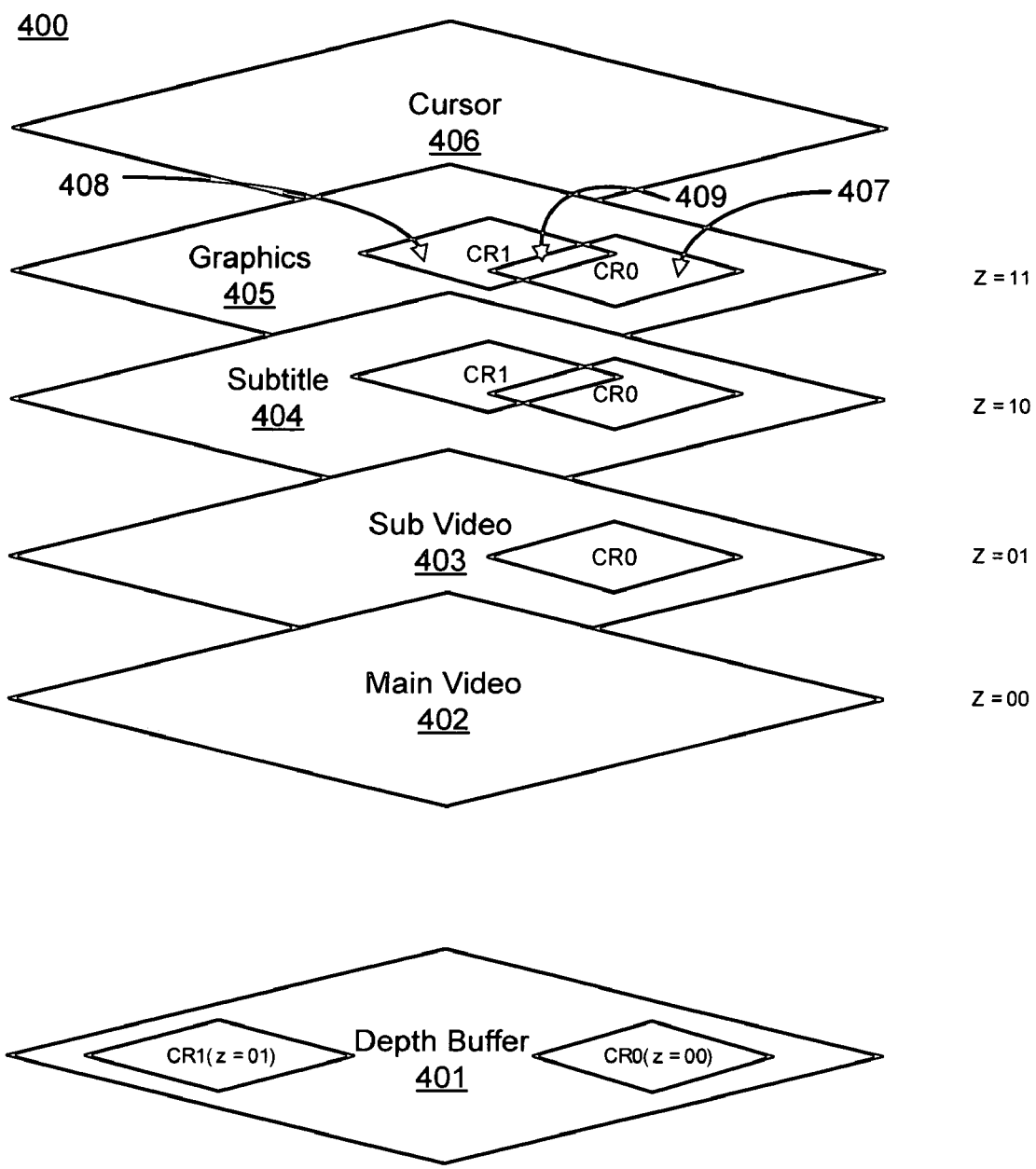
FIG. 4 illustrates a plurality of planes according to some embodiments.

As illustrated in FIG. 4, an embodiment of a video image 400 is shown. The video image may comprise a plurality of planes as described with respect to similarly named planes of FIG. 3. As illustrated in FIG. 4, the video image 400 may comprise a first clear rectangle 307 indicated as CR0 and a second clear rectangle 308 indicated as CR1.

A depth buffer 401 may indicate that CR1 408 has a depth value of 01 and that CR0 407 may have a depth value of 00. As illustrated in FIG. 4, CR1 408 may punch through the graphics plane 405 and the subtitle plane 404 exposing sub-video plane 403 while CR0 407 may punch through the graphics plane 405, the subtitle plane 404 and the sub-video plane 403 exposing the main video plane 402.

In some embodiments, two clear rectangles may overlap and define an overlap area. As illustrated in FIG. 4, CR1 408 and CR0 407 may overlap defining an overlap area 409. The overlap area 409 may have a depth value equal to the lowest depth value of the overlapping clear rectangles. For example, since CR0 407 has a depth value of 00 and CR1 has a depth value of 01, then the overlap area 409 may have a depth value equal to the lowest value, accordingly 00.

Figure 5:
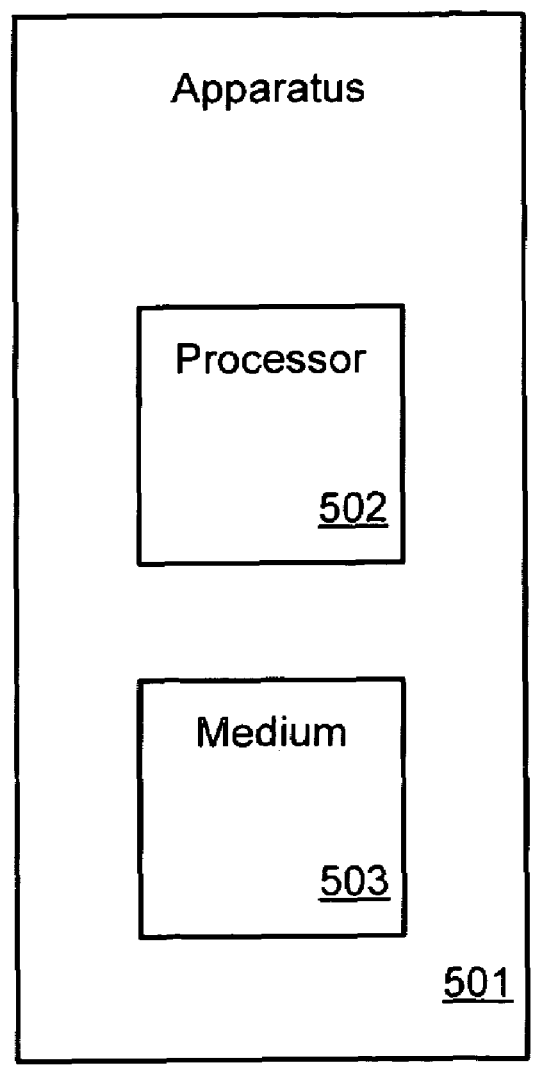
FIG. 5 is a block diagram of an apparatus according to some embodiments.

Now referring to FIG. 5, an embodiment of an apparatus 501 is shown. The apparatus 501 may comprise any electronic system, including, but not limited to, a desktop computer, a server, a graphics card, and a laptop computer. The apparatus may comprise a processor 502 and a medium 503. The medium 503 may store instructions that when executed by the processor 502 may perform a method. In some embodiments, the method may be, but is not limited to, the method described with respect to FIG. 2.

The medium 503 may comprise any magnetic media, read only memory, random access memory, flash memory, non-volatile memory, or any other available medium that may store instructions adapted to be executed by the processor 502.

The processor 502 may comprise any integrated circuit that is or becomes known. For purposes of the present description, the processor 502 may comprise a system for executing program code. The program code may comprise one or more threads of one or more software applications. The processor 502 may include or otherwise be associated with dedicated registers, stacks, queues, etc. that are used to execute program code and/or one or more of these elements may be shared there between.

Figure 6:
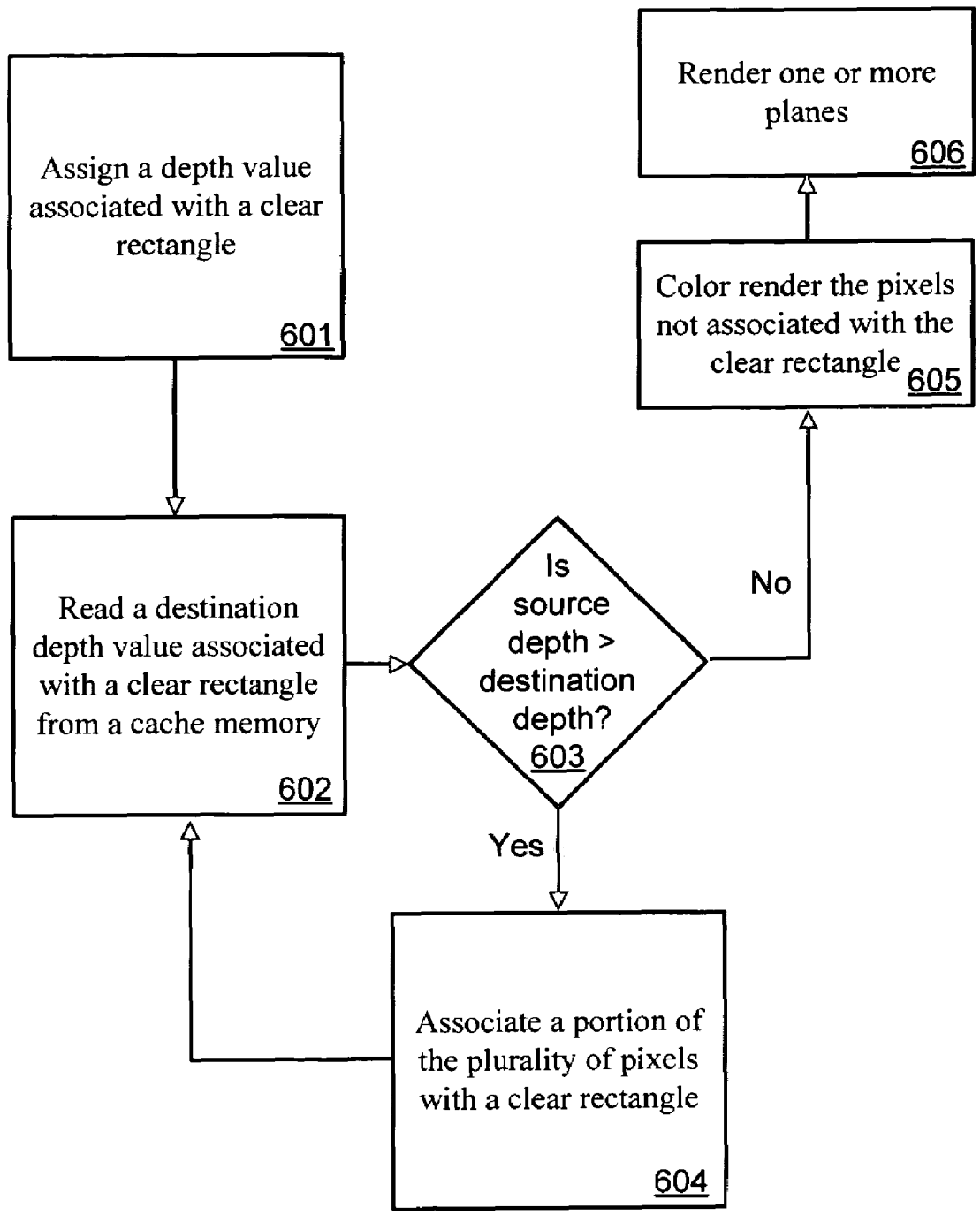
FIG. 6 is a block diagram of a process according to some embodiments.

Now referring to FIG. 6, an embodiment of a process 600 is illustrated. Process 600 may be executed by any combination of hardware, software, and firmware, including but not limited to, the apparatus 500 of FIG. 5 or the system 700 of FIG. 7. In some embodiments, method 600 may render a plurality of planes from a top down perspective. In some embodiments of process 600, the process 600 may be repeated for each plane of a video image. At 601, a depth value is assigned to clear rectangle. In some embodiments, the clear rectangle may be associated with one or more planes of a video image and may comprise a plurality of pixels. During the rendering process, and as shown at 602, a destination depth value associated with the clear rectangle may be read from a cache memory. The depth value may be read from the cache memory by a processor. In some embodiments, the depth value may be read for every pixel at an early depth test function interface on a pixel-by-pixel basis where the early depth test function interface may be the logic that compares the source depth and the destination depth.

A plurality of pixels associated with a plane may be analyzed on a pixel-to-pixel basis at 603 to determine if the source depth of the plurality of pixels is greater than the destination depth in the cache memory. The source depth of the pixels may be an indication of the current plane associated with each pixel of the plurality of pixels and the destination depth may be a depth value stored in cache memory. In some embodiments, the destination depth may be a final depth value.

In some embodiments, the destination depth may change during the rendering process. For example, if the destination depth should ever be greater than the source depth of the plurality of pixels then the depth buffer may be updated with the value of the source depth of the plurality of pixels.

If the source depth of the plurality of pixels is greater (e.g. at a higher level) than the destination depth then, at 604, a portion of the plurality of pixels may be associated with the clear rectangle. In some embodiments, pixels associated with a clear rectangle may not be submitted to an execution unit for color rendering (e.g. these pixels may not be written). 602, 603, and 604 may repeat for each pixel of each plane until the source depth of the plurality of planes is less than or equal to the destination depth. In some embodiments, when the source depth of the plurality of pixels is greater than the destination depth then no depth buffer updates are needed and thus the destination depth cache firmware may not have to write to the cache that holds the depth buffer which may be referred to as a dirty cache line.

Once the source depth is less than or equal to the destination depth, the plurality of pixels associated with the one or more planes may be rendered at 605. Next, at 606, the remaining pixels that may not have been associated with the clear rectangle may be color rendered. By color rendering the remaining pixels after rendering the clear rectangle, less memory and processor resources may be required.

For example, and referring back to FIG. 1, the clear rectangle CR0 may be associated with planes 103, 104, 105 and may have a depth value of 00. When the clear rectangle associated with plane 105 is rendered, CR0 may have a source depth of 11 and a destination depth of 00. Accordingly, the source depth is greater than the destination depth and the pixels associated with CR0 of plane 105 may not be submitted for color rendering. When the clear rectangle associated with plane 104 is rendered, the pixels associated with CR0 may have a source depth of 10 and a destination depth of 00. Since 10 is greater than 00, the pixels associated with CR0 of plane 104 may not be submitted for color rendering. When the clear rectangle associated with plane 103 is rendered, the pixels associated with CR0 may have a source depth of 01 and a destination depth of 00. Therefore, the pixels associated with CR0 of plane 103 may not be submitted for color rendering. Finally, in this example, when rendering plane 102, the source depth and the destination depth are equal. Thus, no pixels of plane 102 will be associated with the CR0.

Figure 7:
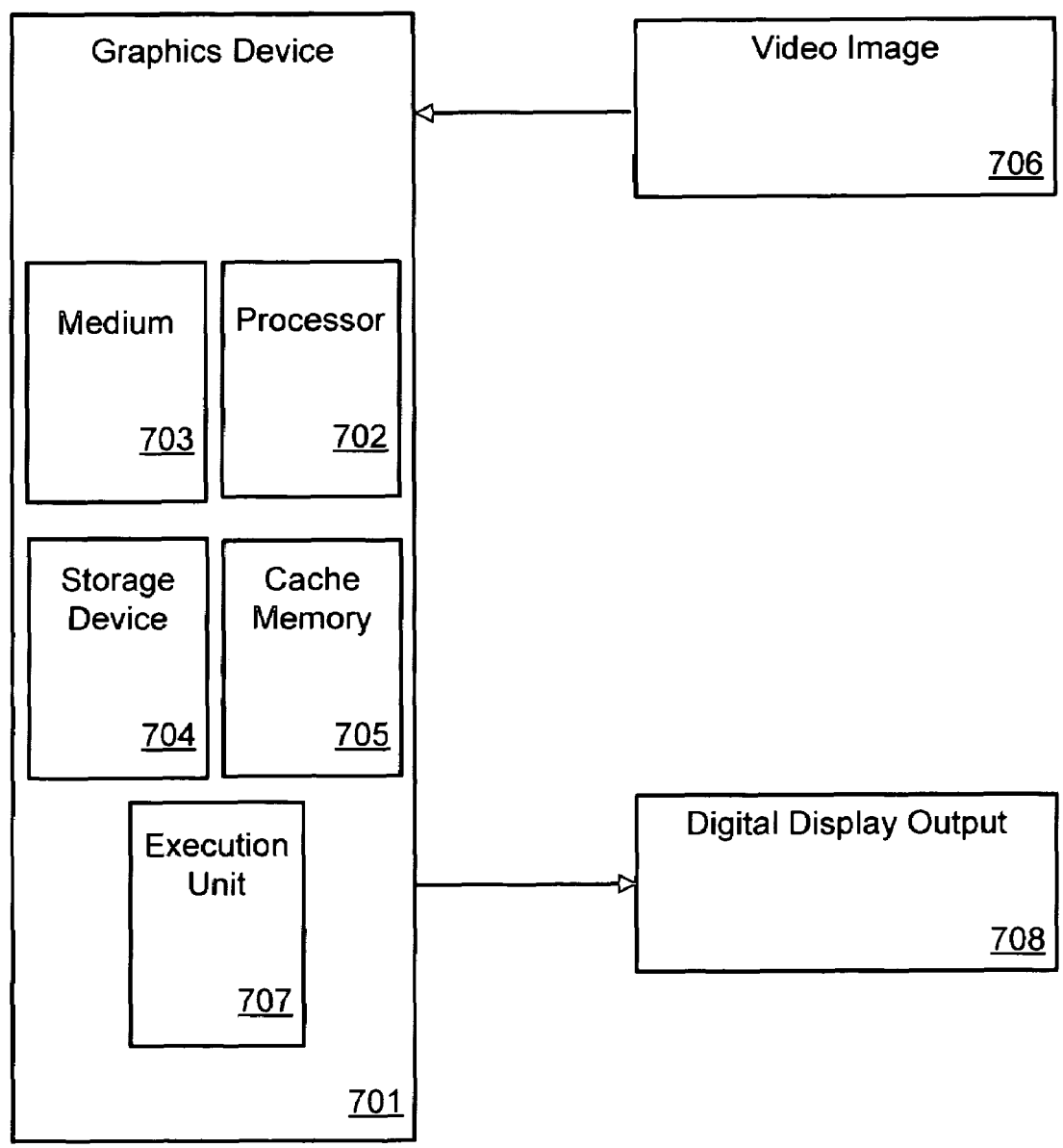
FIG. 7 is a block diagram of a system according to some embodiments.

Now referring to FIG. 7, an embodiment of a system 700 is shown. The system 700 may comprise a graphics device 701, a video image 706, and a digital display output 708. The graphics device 701 may comprise a processor 702, a medium 703, a storage device 704, cache memory 705 an execution unit 707.

In some embodiments, the graphics device 701 may receive information associated with a video image 706 and send the information to a digital display output 708. In some embodiments, the video image 706 may be an HD-DVD image and may comprise a plurality of planes.

The medium 703 may store instructions that when executed by the processor 702 may perform a method. In some embodiments, the method may be, but is not limited to, the method described with respect to FIG. 2 and FIG. 7. The processor 702 may be as described with respect to FIG. 5. In some embodiments, a storage device may store information associated with the video image 706.

The cache memory 705 may comprise any memory device that is or will be known. The cache memory 705 may be faster memory that may store copies of data from frequently used main memory locations. In some embodiments, the cache memory 705 may store a depth buffer.

The execution unit 707 may render each layer of the video image 706. In some embodiments, the execution unit 707 may color render each pixel of the video image 106. In some embodiments, the execution unit may be a processor.

The digital display output 708 may receive a processed video image from the graphics device 701 and provide the processed video image to a display system or display screen.

The foregoing disclosure has been described with reference to specific exemplary embodiments thereof. It will, however, be evident that various modifications and changes may be made thereto without departing from the broader spirit and scope set forth in the appended claims.

What is claimed is:

1. A method comprising:
    associating a first clear rectangle depth value of a video image comprising a plurality of planes using a processor, wherein each plane comprises a plurality of pixels;
    defining a first clear rectangle with respect to the first depth value on one or more of the plurality of planes, where the first clear rectangle is defined by inactivating pixels;
    color rendering the pixels that are not associated with the first clear rectangle;
    and rendering the plurality of planes.

2. The method of claim 1, wherein the first depth value is stored in a depth buffer.

3. The method of claim 2, wherein the depth buffer is stored in cache memory.

4. The method of claim 1, further comprising:
    setting a second depth value of a second clear rectangle for the video image; and
    performing the second clear rectangle with respect to the second depth value.

5. The method of claim 4, wherein the first depth value and the second depth value are different.

6. The method of claim 5, wherein the first clear rectangle overlaps the second clear rectangle.

7. The method of claim 1, wherein the video image is an HD-DVD image.

8. An apparatus comprising:
    a storage device to store information associated with a video image comprising a plurality of display planes;
    a processor; and
    a medium storing instructions that:
    associate a first clear rectangle depth value of a video image comprising a plurality of planes, wherein each plane comprises a plurality of pixels;
    define a first clear rectangle with respect to the first depth value on one or more of the plurality of planes, where the first clear rectangle is defined by inactivating pixels;
    color render the pixels that are not associated with the first clear rectangle; and
    render the plurality of planes.

9. The apparatus of claim 8, wherein the first depth value is stored in a depth buffer.

10. The apparatus of claim 9, wherein the depth buffer is stored in cache memory.

11. The apparatus of claim 8, further comprising instructions to:
    set a second depth value of a second clear rectangle for the video image; and
    perform the second clear rectangle with respect to the second depth value.

12. The apparatus of claim 11, wherein the first depth value and the second depth value are different.

13. The apparatus of claim 8, wherein the video image is an HD-DVD image.

14. A system comprising:
    a digital display output;
    a storage device to store information associated with a video image comprising a plurality of display planes;
    a processor; and
    a medium storing instructions that:
    associate a first clear rectangle depth value of a video image comprising a plurality of planes, wherein each plane comprises a plurality of pixels;
    define a first clear rectangle with respect to the first depth value on one or more of the plurality of planes, where the first clear rectangle is defined by inactivating pixels;
    color render the pixels that are not associated with the first clear rectangle; and
    render the plurality of planes.

15. The system of claim 14, wherein the first depth value is stored in a depth buffer.

16. The system of claim 14, wherein the depth buffer is stored in cache memory.

17. The system of claim 14, further comprising instructions to:
    set a second depth value of a second clear rectangle for the video image; and
    perform the second clear rectangle with respect to the second depth value.

18. The system of claim 14, wherein the first depth value and the second depth value are different.

19. The system of claim 14, wherein the video image is an HD-DVD image.

20. The system of claim 14, further comprising an execution unit to render the plurality of layers.

* * * * *